US008534479B2

(12) United States Patent
Roush

(10) Patent No.: US 8,534,479 B2
(45) Date of Patent: *Sep. 17, 2013

(54) CONTAINER SIDEWALL CONNECTOR

(75) Inventor: Mark Roush, Lafayette, IN (US)

(73) Assignee: Vanguard National Trailer Corporation, Monon, IN (US)

( * ) Notice: Subject to any disclaimer, the term of this patent is extended or adjusted under 35 U.S.C. 154(b) by 115 days.

This patent is subject to a terminal disclaimer.

(21) Appl. No.: 13/049,106

(22) Filed: Mar. 16, 2011

(65) Prior Publication Data
US 2012/0234842 A1 Sep. 20, 2012

(51) Int. Cl.
B65D 88/00 (2006.01)
B65D 90/02 (2006.01)

(52) U.S. Cl.
USPC .......................... 220/1.5; 296/186.1

(58) Field of Classification Search
USPC ................... 220/1.5, 652, 677, 680, 682, 685, 220/4.31, 692, 693; 296/191, 186.1–186.5, 296/203.01, 203.05, 182.1; 52/592.1; 403/300, 403/331, 338
See application file for complete search history.

(56) References Cited

U.S. PATENT DOCUMENTS

| | | | | |
|---|---|---|---|---|
| 2,502,703 A | | 4/1950 | Chaplin | 296/186.1 |
| 3,028,192 A | * | 4/1962 | Jewell | 296/186.1 |
| 3,332,192 A | * | 7/1967 | Kessler et al. | 52/538 |
| 3,334,007 A | * | 8/1967 | Flagan | 428/166 |
| 3,880,460 A | * | 4/1975 | Pennock | 296/29 |
| 3,917,338 A | | 11/1975 | Becker | 410/116 |
| 4,188,149 A | * | 2/1980 | Gray | 403/271 |
| 4,810,027 A | | 3/1989 | Ehrlich | 296/186.1 |
| 5,058,756 A | | 10/1991 | Green | 220/1.5 |
| 5,078,530 A | * | 1/1992 | Kim | 403/24 |
| 5,112,099 A | | 5/1992 | Yurgevich | 296/186.1 |
| 5,439,266 A | | 8/1995 | Ehrlich | 296/186.1 |
| 5,579,624 A | * | 12/1996 | Aeberhard | 52/586.2 |
| 5,584,252 A | | 12/1996 | Smith | 105/409 |
| 5,791,093 A | * | 8/1998 | Diamond | 52/36.5 |
| 6,003,932 A | * | 12/1999 | Banerjea et al. | 296/186.1 |
| 6,290,182 B1 | * | 9/2001 | Grunditz | 244/173.1 |
| 6,607,237 B1 | | 8/2003 | Graaff | 296/186.1 |
| 6,652,019 B1 | * | 11/2003 | Bennett | 296/186.1 |
| 6,959,959 B1 | | 11/2005 | Roush | 296/186.1 |
| 7,011,358 B2 | | 3/2006 | Graaff | 296/186.1 |
| 7,134,820 B2 | | 11/2006 | Ehrlich | 410/150 |
| 7,152,912 B1 | * | 12/2006 | Roush et al. | 296/186.1 |
| 7,500,713 B2 | | 3/2009 | Riley | 296/191 |
| 7,527,325 B2 | | 5/2009 | Yurgevich | 296/186.1 |
| 7,798,753 B2 | | 9/2010 | Yurgevich | 410/115 |
| 7,828,372 B2 | | 11/2010 | Ellison | 296/191 |
| 7,862,103 B2 | | 1/2011 | Riley | 296/186.1 |
| 8,016,527 B2 | | 9/2011 | Pattison | 410/115 |
| 2002/0067950 A1 | * | 6/2002 | Price et al. | 403/338 |
| 2002/0101095 A1 | | 8/2002 | Gosselin | 296/186.1 |
| 2003/0071486 A1 | * | 4/2003 | Graaff et al. | 296/181 |
| 2003/0080583 A1 | | 5/2003 | Jones | 296/186.1 |
| 2003/0080586 A1 | | 5/2003 | Ehrlich | 296/191 |
| 2004/0145215 A1 | | 7/2004 | Taguchi | 296/187.02 |

(Continued)

Primary Examiner — Anthony Stashick
Assistant Examiner — Robert Stodola
(74) Attorney, Agent, or Firm — Taft Stettinius & Hollister LLP

(57) ABSTRACT

An improved panel and sidewall construction is presented. The sidewall includes a post with a pocket, and in the pocket external liners of the sidewall are secured. Flexible interior panels are secured in the posts with two protrusions that extend laterally and inwardly from the post. The posts also include slots for logistics panel that serve as a tie-down points for securing cargo.

18 Claims, 9 Drawing Sheets

(56) References Cited

U.S. PATENT DOCUMENTS

| | | | |
|---|---|---|---|
| 2004/0217625 A1 | 11/2004 | Graaf | 296/186.1 |
| 2004/0232728 A1 | 11/2004 | Smidler | 296/186.1 |
| 2006/0061136 A1* | 3/2006 | Pines | 296/186.1 |
| 2006/0071507 A1 | 4/2006 | Graaff | 296/186.1 |
| 2007/0200393 A1 | 8/2007 | Riley | 296/191 |
| 2007/0290522 A1* | 12/2007 | Graaff et al. | 296/186.1 |
| 2009/0026215 A1* | 1/2009 | Roush et al. | 220/652 |
| 2009/0146454 A1 | 6/2009 | Riley | 296/186.1 |

* cited by examiner

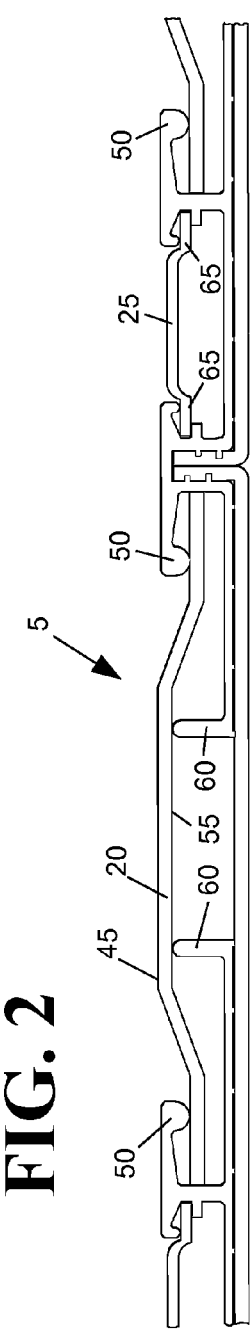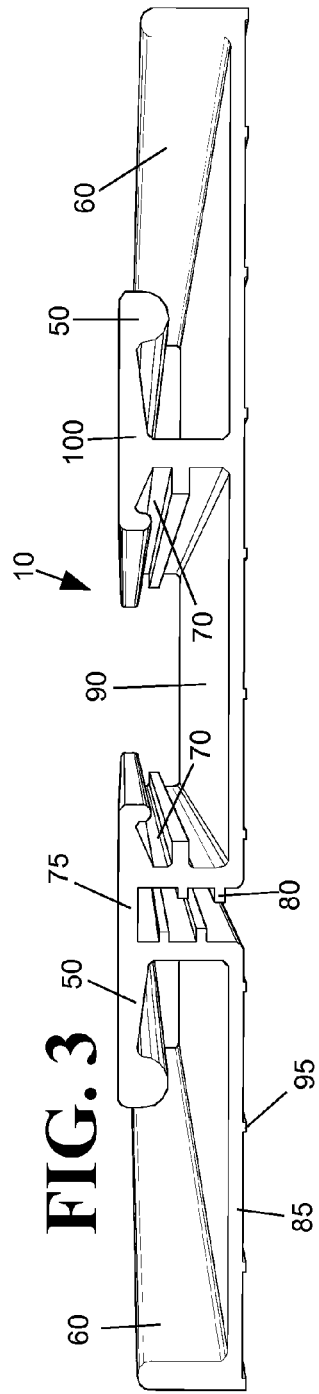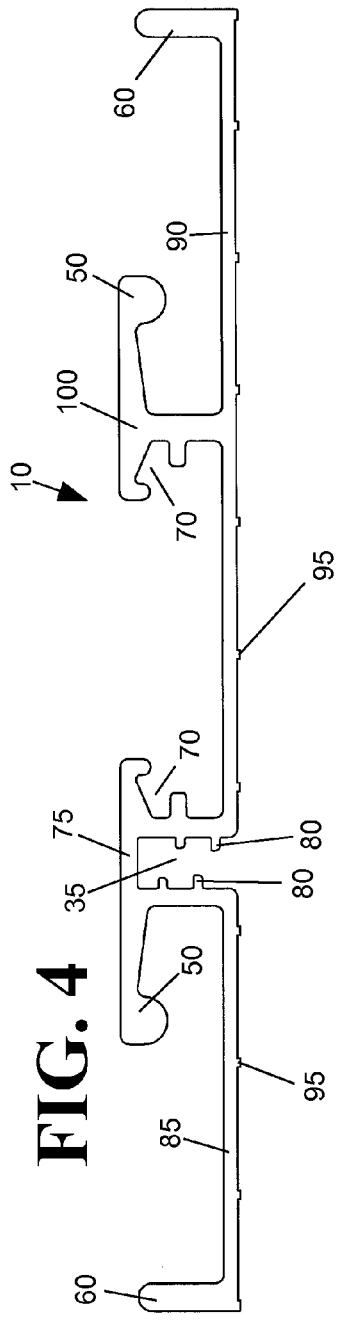

CONTAINER SIDEWALL CONNECTOR

FIELD OF THE INVENTION

The present invention relates generally to a sidewall construction for a cargo container, and more particularly to a thin structural panel and post connector sidewall construction.

BACKGROUND OF THE INVENTION

Designers of cargo containers have long faced many related challenges in the design of container sidewalls. First, the structural integrity of the overall container depends on the rigidity and strength of the sidewalls. Second, the sidewalls are optimally light in weight to reduce the transportation costs for the overall container.

Third, government regulations or industry standards often limit the exterior dimensions of cargo containers. Thus, to maximize the capacity of the container, designers seek to minimize the width of the sidewalls without compromising the structural integrity of the container.

Fourth, because cargo containers are repeatedly loaded and unloaded, the interior walls of the container must be resistant to the repeated impact of vehicles and implements used to load and unload the container. Containers must optimally be free of protrusions and snag points that could impede loading and unloading. Fifth, means for securing and dividing cargo within a container are often desirable, and may be provided by incorporating logistics slots in the sidewalls of the container. Sixth, even resilient sidewalls may become damaged with extended use and require replacement or repair, Seventh, installing bolts or rivets commonly used in assembling sidewalls increases the container construction time, sidewall thickness, and the cost of the container. Eighth, various thicknesses of panels are used in container construction based on the desired characteristics of the container. Connectors between panels must be adaptable to these various thicknesses. Other considerations, including the cost and availability of the sidewall components and the ease of manufacturing, are also important.

These challenges are particularly acute in the design and construction of sidewalls for over-the-road trailers. Structural integrity for trailers is of course essential to the safe transportation of goods and materials on public highways. This structural integrity has conventionally been provided by either a "sheet and post" or a structural panel sidewall construction.

In sheet and post sidewall construction, vertical posts are used to provide the primary structural integrity for the trailer. Such posts are typically formed by bending or roll forming galvanized steel or extruding aluminum into non-linear shapes, thus providing rigidity and strength for the post. Relatively thin and easily replaceable sidewall sheets, typically made of plywood or plastic, are attached to the vertical posts in the interior of the trailer and a protective outer skin is attached to the exterior of the trailer. A protective metal, wood, or plastic liner may also be provided at the base of the interior sidewall to protect the sheets and posts from being damaged or pierced by vehicles loading and unloading the trailer. This sheet and post design offers certain advantages, including high structural strength attributable to the vertical posts, lower cost and ease of manufacturing, among others. Also, although the thin interior sheets are susceptible to damage, these sheets are relatively inexpensive and easy to replace. Conventional sheet and post designs, however, suffer from a key disadvantage, namely, the thickness of the posts required to provide structural integrity for the trailer.

Structural panel sidewalls have also been used in the construction of over-the-road trailers to address many of the challenges related to cargo containers. In particular, because of the strength and rigidity of the structural panels, sidewall thickness can generally be reduced as compared to conventional sheet and post designs. The structural panels are typically joined at their edges with vertical splicer plates on the inside and outside of the trailer, as shown in U.S. Pat. No. 4,904,017 (FIG. 9) issued to Ehrlich, U.S. Pat. No. 5,860,693 (FIG. 2) issued to Ehrlich and U.S. Pat. No. 6,450,564 (FIG. 3) and U.S. Pat. No. 6,578,902 (FIGS. 4 and 5) issued to Sill. The structural panels may also be joined with vertical posts on the inside and outside of the trailer, as disclosed in the applicant's U.S. Pat. No. 7,152,912 and incorporated herein by reference. These vertical posts are typically provided with logistics slots for securing and dividing cargo within the trailer.

Structural panels are often composite panels made of a core plastic material and an outer skin of aluminum or steel. The metal skin of the panels is resistant to damage when the cargo is loaded and unloaded, and because of the strength and rigidity of the composite panels, trailer sidewall thickness can generally be reduced as compared to sheet and post designs. Although lighter in weight than solid aluminum panels, composite panels are typically more expensive than the materials used in conventional sheet and post designs. Additionally, structural panel sidewalls are difficult and expensive to replace if a single panel becomes damaged.

The use of rivets to connect structural panels to posts or plates often increases the thickness of the sidewall, and also increases the number of snag points inside the container. Additionally, the use of rivets increases the number of parts used in constructing the container which can increase the cost and time to manufacture a cargo container.

Some of the advantages of a rivetless cargo container sidewall that combines the thin cross-section of structural panel sidewalls with the easily replaceable interior panels of a sheet and post configuration have been recognized.

U.S. Pat. No. 5,584,527 issued to Sitter discloses a "plate-type" trailer with a rivetless and boltless sidewall construction. This configuration includes corrugated panels and "seam extrusion members" that connect the corrugated panels. The corrugation of the paneling in the '527 patent decreases the total available space inside the trailer, and the connectors make panel replacement difficult. Thus, the need remains for a rivetless and boltless sidewall construction that allows for easy replacement of damaged panels.

U.S. Pat. No. 5,403,062 issued to Sjostedt discloses a "panel joint" trailer with a rivetless and boltless sidewall construction. This configuration includes modular panels with integral protrusions, tapered end sections, and adhesive to join the tapered end section of one panel to the integral protrusion section of another panel. The panels disclosed by the '062 patent are highly interconnected, and therefore not easily replaceable.

U.S. Pat. Nos. 5,860,693, 6,220,651, 6,412,854, 6,986, 546, and 7,069,702 issued to Ehrlich disclose a structural panel joint configuration. This configuration includes a pair of panels and two metal plates connected by rivets. However, the panels are not easily replaceable due to the use of rivets.

Accordingly, an object of the present invention is to provide a sidewall construction for a cargo container that is lightweight yet rigid and strong.

A further object of the present invention is to provide a cargo container with thin sidewalls to maximize the capacity of the container.

Another object of the present invention is to provide a sidewall construction that does not require the use of bolts or rivets.

Yet another object of the present invention is to provide a cargo container with interior walls resistant to the impact of vehicles and implements used to load and unload the container, and to provide a cargo container with minimal protrusions and snag points that could impede the loading or unloading of the container.

An additional object of the present invention is to provide a cargo container sidewall with panels that can be easily removed and replaced in the event they become damaged.

A still further object of the present invention is to provide a cargo container with interior logistics slots in the container sidewalls for securing cargo.

Finally, an object of the present invention is to provide a cargo container sidewall configuration that that is economical to manufacture and refined in appearance.

SUMMARY OF THE INVENTION

An improved panel and connector sidewall construction is presented. While maintaining the benefits of standard structural panel designs, the post connector construction also achieves many benefits of traditional sheet and post designs, including simplified replacement of damaged interior panels. The design also allows for simplified replacement of the outer panels of the container while simultaneously providing an aerodynamic surface without protruding rivets. The sidewall construction also achieves the important objective of providing smooth trailer walls with minimal recesses, protrusions and snag points.

The composite panel container sidewall construction provides additional interior logistics slots in the sidewalls of the container for securing cargo loaded into the container. These additional interior logistics slots are provided by a vertical support that is seated in the post to avoid creating snag points on the interior of the trailer. The sidewall construction also achieves the benefits of conventional composite panel designs, including the recognized benefit of thin container sidewalls that provide an overall interior trailer width of at least 101 inches.

These and other advantages will become apparent as this specification is read in conjunction with the accompanying drawings and claims.

BRIEF DESCRIPTION OF THE DRAWINGS

FIG. 2 is a top view of a sidewall with logistics slots, outer sheets and inner liners connecting to posts.

FIG. 3 is a top perspective view of a sidewall with logistics slots, outer sheets and inner liners connecting to posts.

FIG. 4 is a top view of a post.

DETAILED DESCRIPTION

The sidewall construction may be used with any type of transportable cargo container and is particularly suited for applications requiring a large, lightweight container that is regularly loaded and unloaded by utility vehicles. The improved sidewall construction may be used with containers transported by road, rail, sea, or air. However, for descriptive purposes, the sidewall construction will be described in use with an over-the-road trailer.

Figure 1:
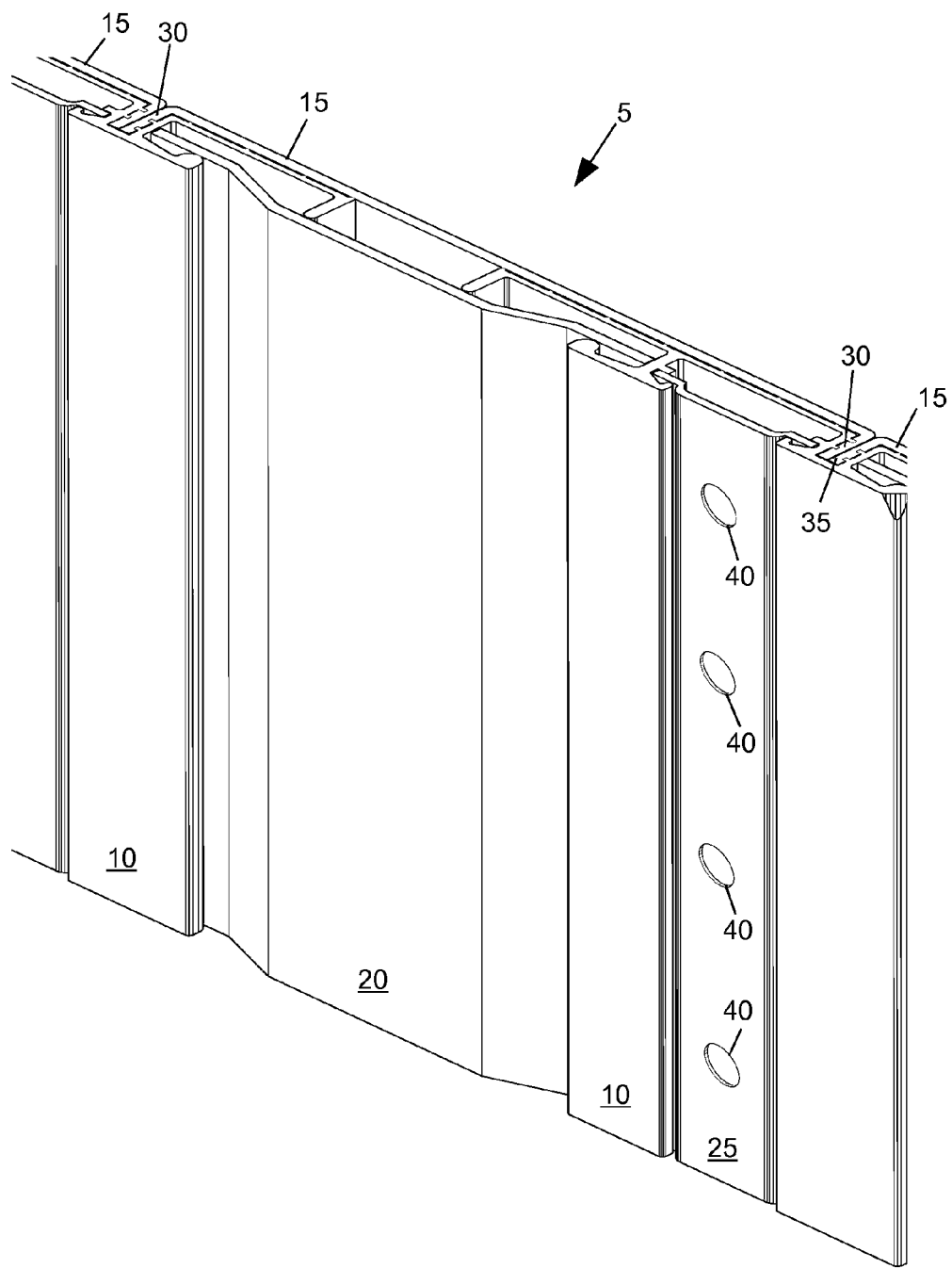
FIG. 1 is a perspective view of a sidewall with logistics slots, outer sheets and inner liners connecting to posts.
Figure 5:
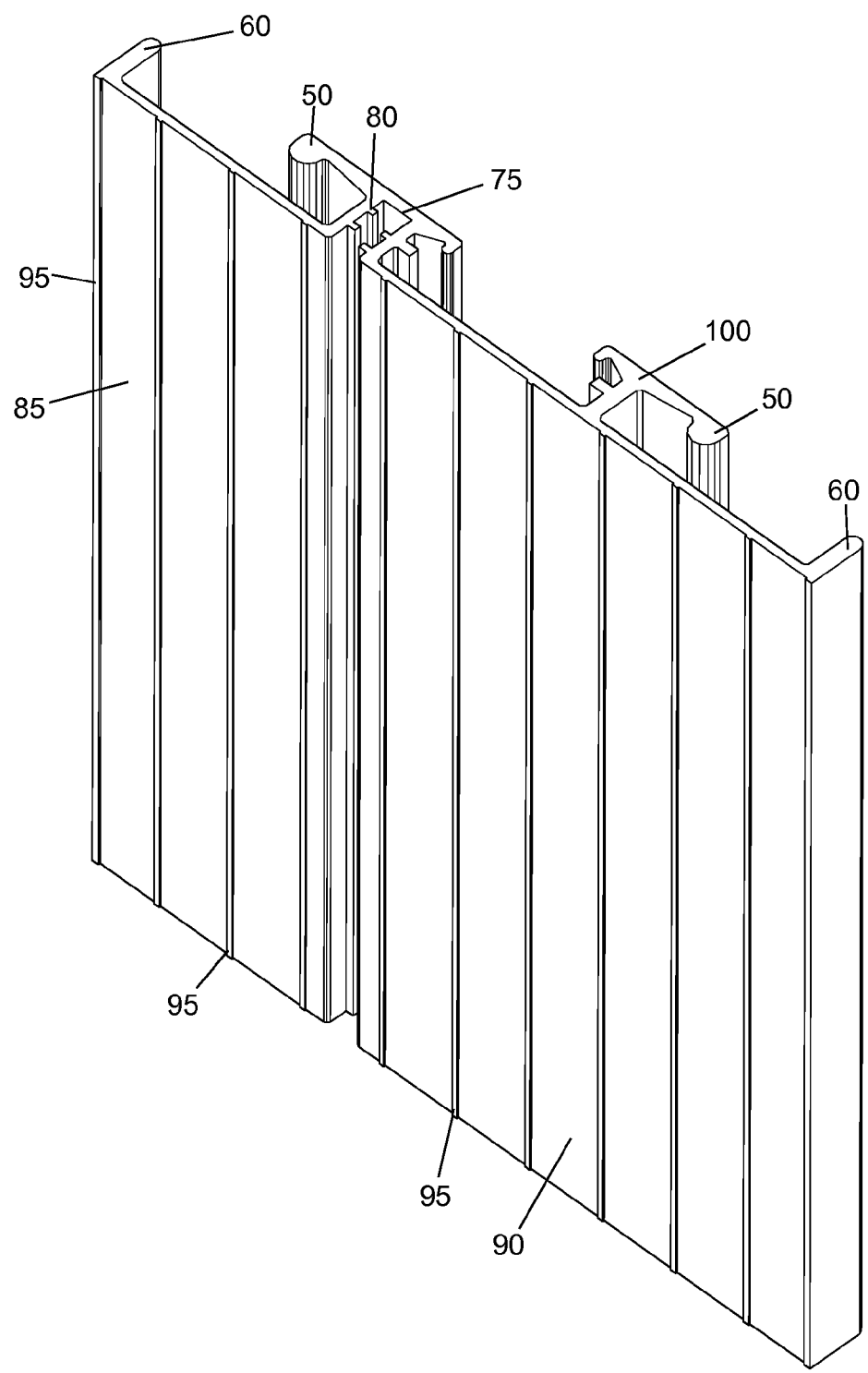
FIG. 5 is an outer perspective view of a post.
Figure 6:
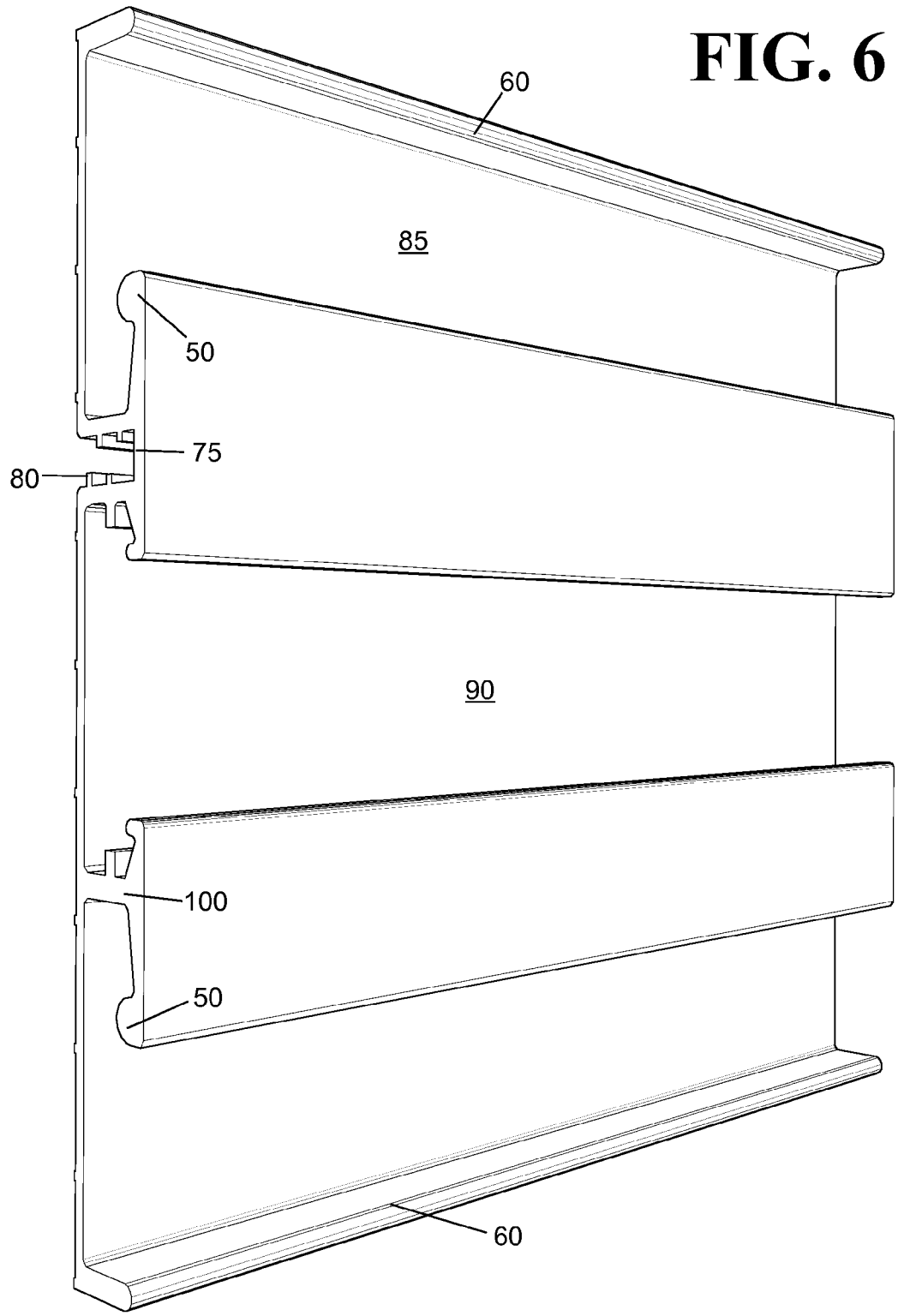
FIG. 6 is an inner perspective view of a post.
Figure 7:
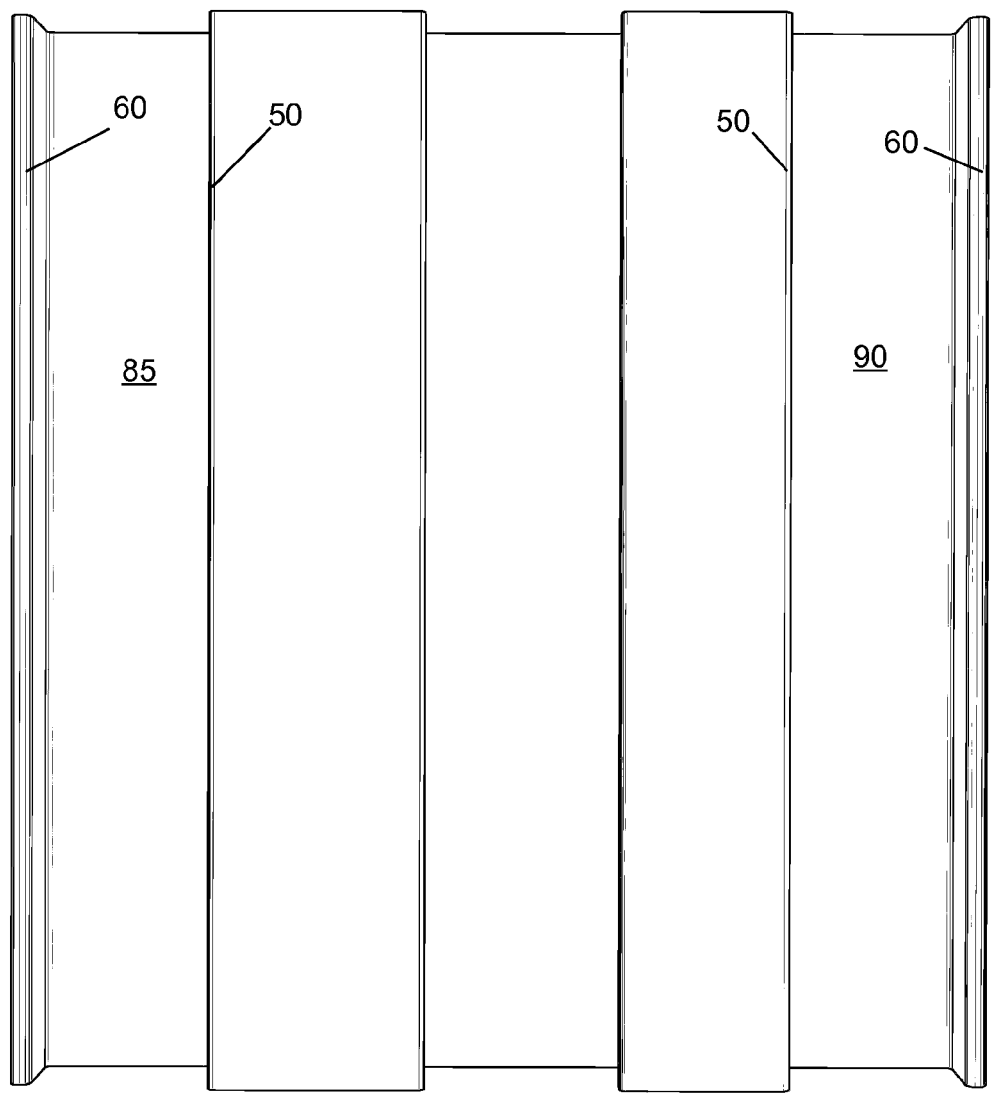
FIG. 7 is a front view of a post.
Figure 8:
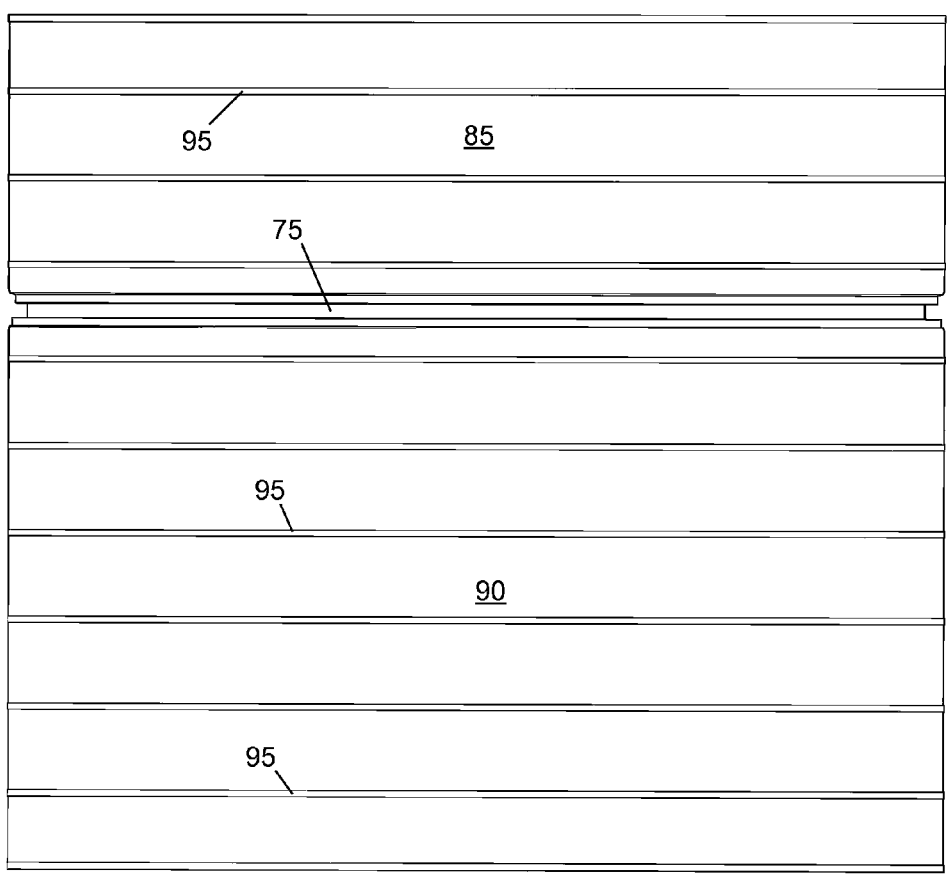
FIG. 8 is a rear view of a post.

FIG. 1 shows a side perspective view of a sidewall 5 constructed from posts 10, outer sheets 15, inner liners 20 and logistics panels 25. The outer sheets 15 have inward protrusions 30 that are secured into pockets 35 in the posts. The logistic panels 25 include logistic slots 40 that may be used to secure cargo or tie downs to the sidewall of the trailer.

The inner liners 20 are preferably constructed of recycled or virgin polyethylene, and thus are flexible and resilient upon impact. The flexibility of the liners 20 enables them to be bent slightly and inserted into the posts 10 after the posts are secured in place. However, the liners 20 may also be slid into place from the top of the posts 10, or placed in position when the posts 10 are secured in place. Although resistant to damage, the liners 20 may be easily removed for replacement in the event that the liners do become damaged.

As shown in FIG. 2, the liner 20 is held securely in place because the inner surface 45 of the liner 10 is pressed against a lateral protrusion 50 of the post 10. The outer surface 55 of the liner 20 is pressed against inward protrusions 60 of the posts 10. Because the liner 20 is held securely in place by the novel configuration of the post 10, rivets or screws are not needed to attach the liner to the post. Thus, unlike conventional sheet and post designs, potential protrusions and snag points are eliminated.

The logistic panels 25 have lateral wings 65 that seat in the logistics seat 70 of the post 10. The logistic panels 25 are preferably made of a rigid material such as metal so they are slid into place from the top of the posts 10, or placed in position when the posts are secured in place. However, flexible logistic panels may be bent into position in a manner similar to the liners. Since flexible logistic panels may not be appropriate for securing cargo to the sidewall, the flexible panels are preferably used when logistic slots are not needed. Alternatively, a sidewall may be constructed with a mix of lightweight plastic logistic panels and rigid metal logistic panels when a full compliment of tie down locations is not needed and the weight of the sidewall is to minimized.

FIGS. 3 through 8 show views of a post 10. The post 10 has a pocket 75 for receiving and securing inward protrusions of the outer sheets. Inside of the pocket 75 there are multiple ridges 80 that act to mechanically secure the outer sheets to the post. Adhesive may also be used to secure the outer sheets to the pocket. Laterally extending from the pocket are a first wall 85 and a second wall 90 that run adjacent to the outer sheets. In the illustrated example of FIGS. 3 and 4, the walls (85 and 90) extend to the inward protrusions 60 of the post. However, the walls may extend beyond the inward protrusions, such as shown in FIGS. 9, 10, 12 and 13. Small outward protrusions 95 extend from the walls toward the outer sheets. Adhesive may be placed between the small outward protrusions to help secure the post to the outer sheets. A lateral protrusion 50 extends away from the pocket 75 towards one of the inward protrusions 60 and is structured to press against and secure the inner surface of a liner.

Extending inward from the second wall 90 between an inward protrusion 60 and the pocket is an inward projection 100 that forms part of the logistics seat 70. A lateral protrusion 50 also extends away from the inward projection 100. Both lateral protrusions 50 act to secure the inner surface of a liner.

Figure 9:
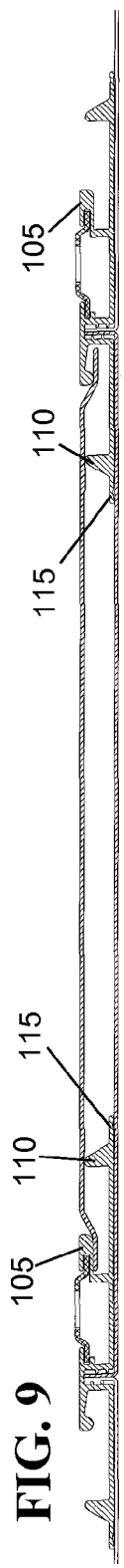
FIG. 9 is a top view of a second embodiment of a sidewall.
Figure 10:
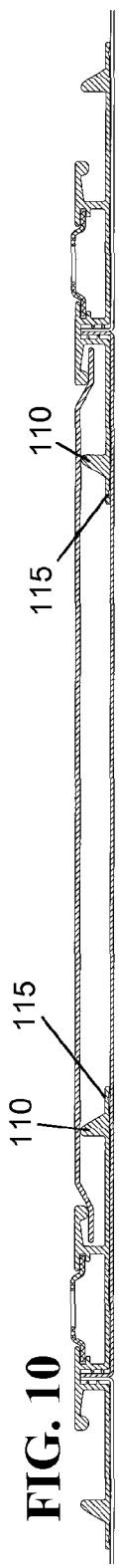
FIG. 10 is a top view of a third embodiment of a sidewall.
Figure 12:
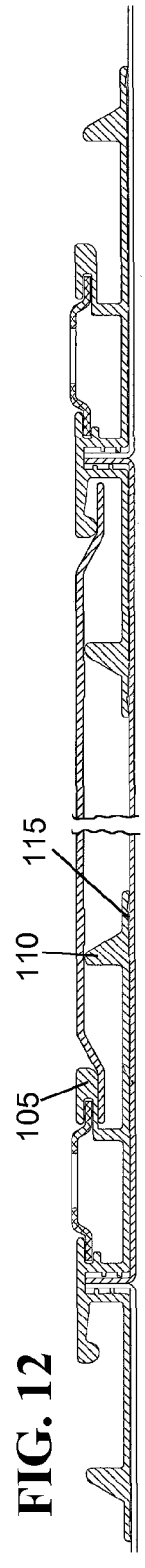
FIG. 12 is a compressed top view of the second embodiment of the sidewall.
Figure 13:
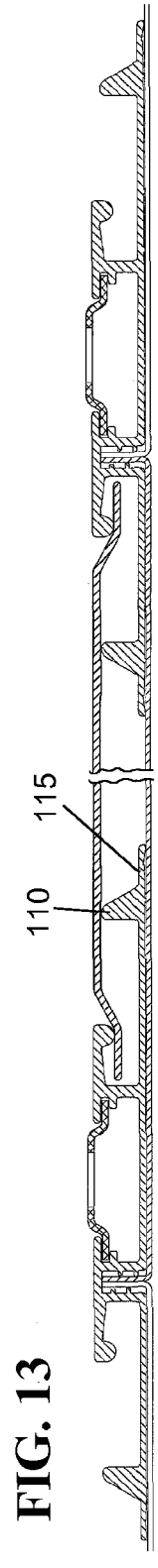
FIG. 13 is a compressed top view of the third embodiment of the sidewall.

FIGS. 9 and 12 illustrate a second embodiment of a sheet and post side wall. In the sidewall shown in FIGS. 9 and 12, the post has a combined logistics seat 105 that acts as both the logistics seat for the logistics panel and the lateral protrusion for securing the inner liner. Also, the post has rounded inward protrusions 110 and wall extensions 115. The larger rounded protrusions may help to prevent the liner from cracking or breaking if the sidewall is impacted from within the cargo container. The wall extensions 115 provide additional surface area for adhesively securing the outer sheets to the post. FIGS. 10 and 13 illustrate the third embodiment of the sidewall with rounded inward protrusions 110 but lacking the combined lateral protrusion and logistics seat.

Figure 11:
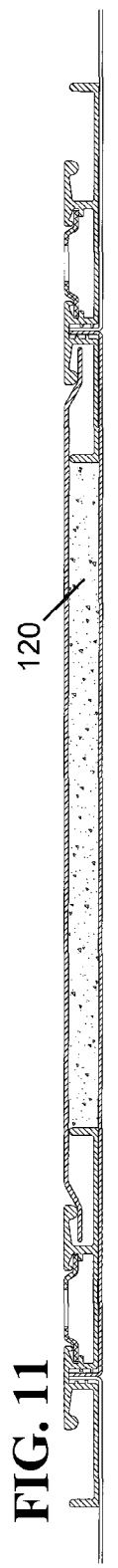
FIG. 11 is a top view of a fourth embodiment of a sidewall used for refrigerated trailers.
Figure 14:
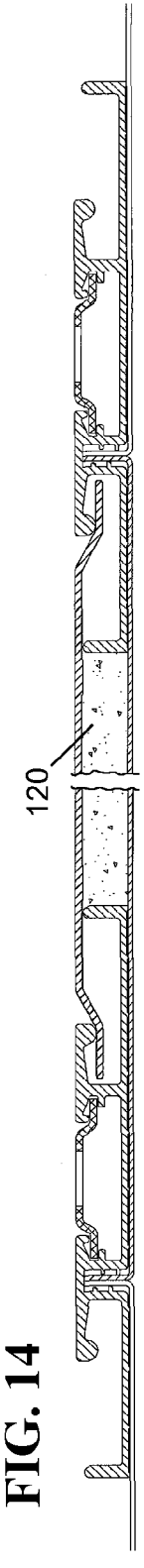
FIG. 14 is a compressed top view of the fourth embodiment of the sidewall.

FIGS. 11 and 14 illustrate an embodiment of a sidewall construction where insulation 120 has been applied between the outer sheets and the inner liner. The insulated sidewall construction is particularly well suited for refrigerated trailers.

Figure 15:
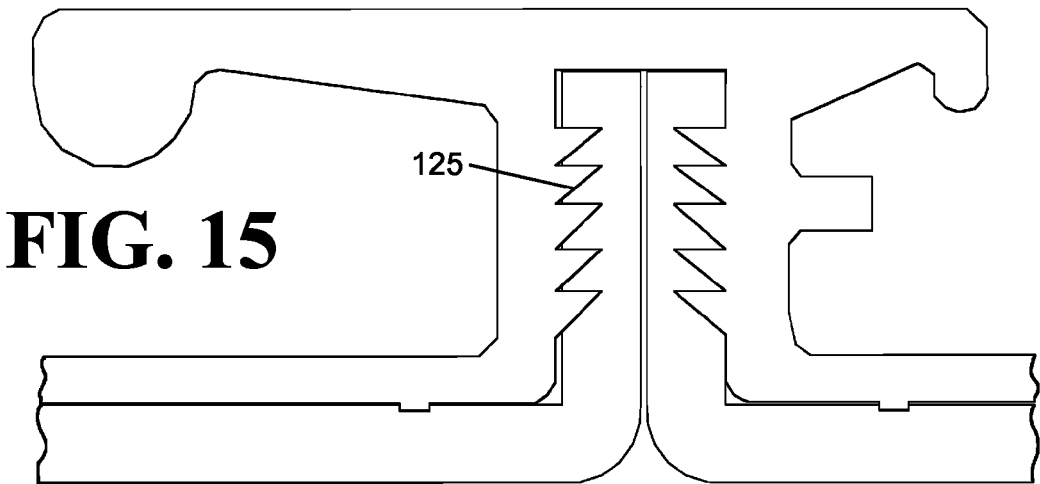
FIG. 15 is a side view of a post with ratcheting grooves securing outer sheets.
Figure 16:
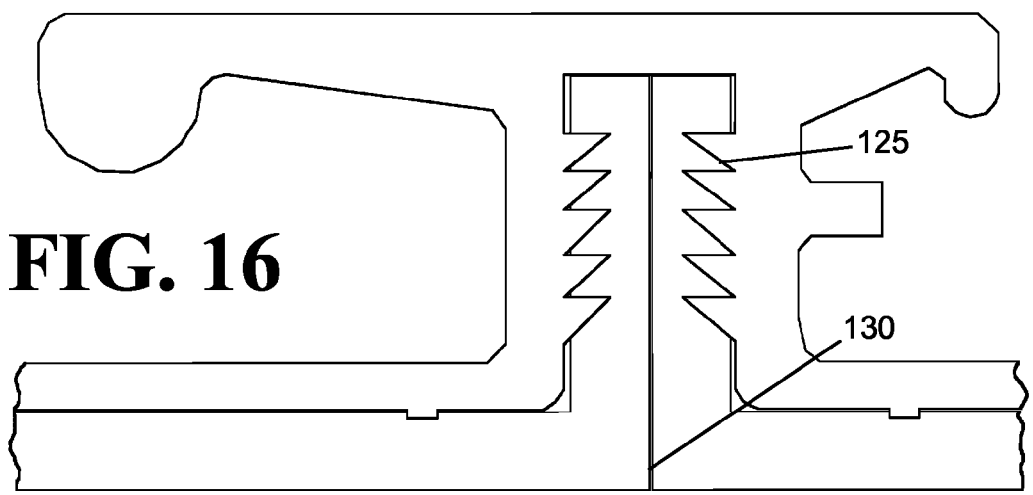
FIG. 16 is a side view of a post with ratcheting grooves securing outer sheets with flush rectangular edges.
Figure 17:
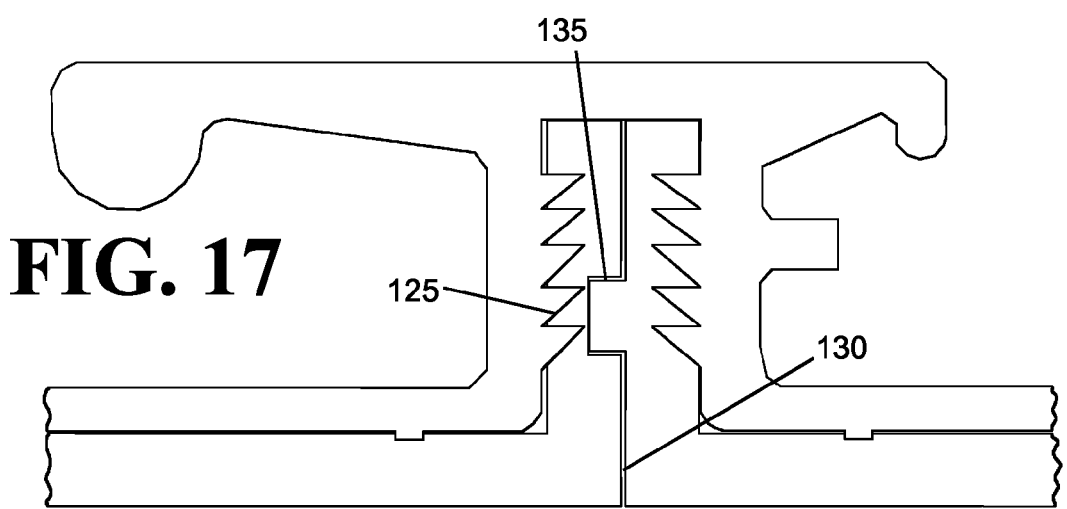
FIG. 17 is a side view of a post having ratcheting grooves securing interlocking outer sheets with flush rectangular edges.
Figure 18:
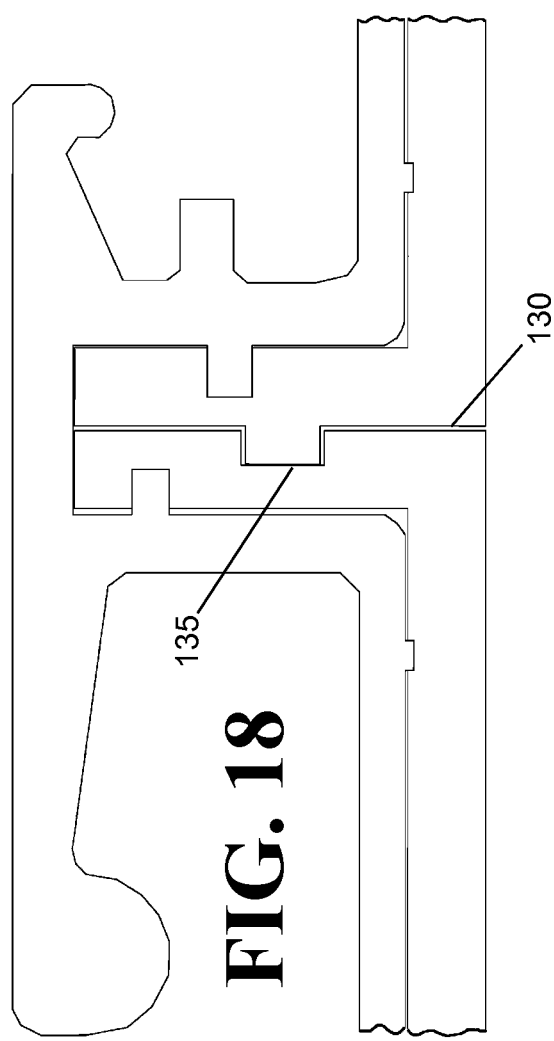
FIG. 18 is a side view of a post securing interlocking outer sheets with flush rectangular edges.

FIG. 15 illustrates an example of a pocket that has ratcheting grooves 125 that facilitate easy entry of the outer sheets into the pocket while also securely holding the sheets in the pocket. FIG. 16 shows outer sheets with rectangular edges 130. The rectangular edges provide a smooth aerodynamic outer surface for a trailer. FIG. 17 shows sheets with interlocking features 135 that not only secure the outer sheets to the post, but also to themselves. FIG. 18 shows another combination of sheets with rectangular edges 130 and interlocking features 135 without the ratcheting grooves of FIGS. 15 through 17.

Figure 19:
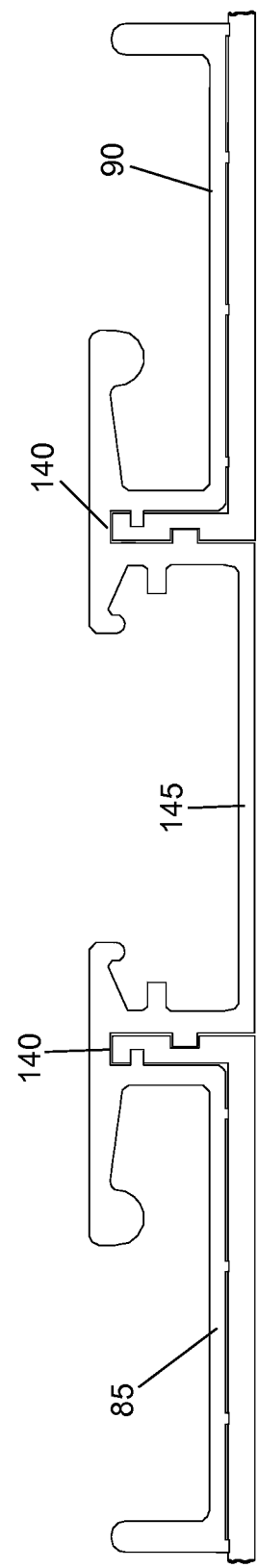
FIG. 19 is a side view of a post having separate pockets individually securing outer sheets.

FIG. 19 illustrates an alternate embodiment of a post having dual pockets 140 that separately receive outer sheets. The first wall 85 and the second wall 90 of the post are separated by a center wall 145. The center wall 145 extends beyond the first and second walls so that the outer surface of the sidewall construction is relatively smooth.

The materials used in the side wall construction may include, but are not limited to, wood, metals, carbon fibers, and polymers. The individual components may be of a uniform or variant composition. A protective coating may be added to any material to protect it from road spray and general corrosion.

The inventors contemplate several alterations and improvements to the disclosed invention. Other alterations, variations, and combinations are possible that fall within the scope of the present invention. Although the preferred embodiment of the present invention has been described, those skilled in the art will recognize other modifications that may be made that would nonetheless fall within the scope of the present invention.

I claim:

1. A container having an interior for the storage and transport of cargo, a sidewall construction of the container comprising:
    a first and second sheet, each sheet having an inner surface oriented towards the interior of the container, an outer surface exposed to an outside of the container, and a protrusion extending towards the interior of the container from an edge of the inner surface;
    a post having
        a pocket enclosing the protrusions of the first and second sheets,
        a first wall laterally extending from the pocket, adjacent to the inner surface of the first sheet, to a first inward projection, and
        a lateral projection extending laterally from the pocket towards the first inward projection;
        a second wall laterally extending from the pocket, adjacent to the inner surface of the second sheet, to a second inward projection;
        a third inward projection extending from the second wall between the second inward projection and the pocket, the third inward projection located distant from the pocket;
    a first liner having
        a first central region extending away from the post parallel to the first sheet,
        an first interior surface contacting the lateral projection, and
        a first exterior surface contacting the first inward projection;
    a second liner having
        a second central region extending away from the post parallel to the second sheet,
        a second interior surface contacting the third inward projection, and
        a second exterior surface contacting the second inward projection; and
    a logistics plate located between the third inward projection and the pocket.

2. The container of claim 1 further comprising
    the first wall adhesively bound to the inner surface of the first sheet, and
    the second wall adhesively bound to the inner surface of the second sheet.

3. The container of claim 1 wherein
    the protrusions of the first and second sheets extend from a bottom of the sidewall to a top of the sidewall.

4. The container of claim 3 wherein
    the protrusions of the first and second sheets extend within the pocket from the bottom of the sidewall to the top of the sidewall.

5. The container of claim 1 further comprising
    thermal insulation between the first central region of the first liner and the first sheet.

6. The container of claim 1 wherein
    the inner surface of the first sheet extends from the protrusion of the inner sheet to beyond the first inward projection.

7. The container of claim 1 wherein
    all of the first wall is adjacent to the inner surface of the first sheet.

8. A container having an interior for the storage and transport of cargo, a sidewall construction of the container comprising:
    a first and second sheet, each sheet having an inner surface oriented towards the interior of the container, an outer surface exposed to an outside of the container, and a protrusion extending towards the interior of the container from an edge of the inner surface;

a post having
- a pocket enclosing the protrusions of the first and second sheets,
- a first wall laterally extending from the pocket, adjacent to the inner surface of the first sheet, to a first inward projection, and
- a second wall laterally extending from the pocket, adjacent to the inner surface of the second sheet, to a second inward projection; and a first liner having
- a first central region extending away from the post parallel to the first sheet,
- a first interior surface contacting the first inward projection.

9. The container of claim 8 further comprising
the post including a third inward projection extending from the second wall between the second inward projection and the pocket, the third inward projection located distant from the pocket.

10. The container of claim 9 further comprising
a second liner having
- a second central region extending away from the post parallel to the second sheet,
- a second interior surface contacting the third inward projection, and
- a second exterior surface contacting the second inward projection.

11. The container of claim 9 further comprising
a logistics plate located between the third inward projection and the pocket.

12. The container of claim 8 wherein
the protrusions of the first and second sheets extend within the pocket from a bottom of the sidewall to a top of the sidewall.

13. The container of claim 8 further comprising
the first wall adhesively bound to the inner surface of the first sheet, and
the second wall adhesively bound to the inner surface of the second sheet.

14. The container of claim 8 further comprising
the first wall including a first plurality of spacers exteriorly extending to the first sheet,
the second wall including a second plurality of spacers exteriorly extending to the second sheet.

15. The container of claim 14 further comprising
an adhesive between the first plurality of spacers.

16. The container of claim 8 further comprising
thermal insulation between the first central region of the first liner and the first sheet.

17. The container of claim 8 wherein
the inner surface of the first sheet extends from the protrusion of the inner sheet to beyond the first inward projection.

18. The container of claim 8 wherein
all of the first wall is adjacent to the inner surface of the first sheet.

\* \* \* \* \*